(12) United States Patent
Kang

(10) Patent No.: US 9,303,984 B2
(45) Date of Patent: Apr. 5, 2016

(54) METHOD AND APPARATUS FOR DETECTING DISTANCE BETWEEN VEHICLES

(71) Applicant: IDRO CO., LTD., Suwon-si (KR)

(72) Inventor: Yanggi Kang, Yongin-si (KR)

( * ) Notice: Subject to any disclaimer, the term of this patent is extended or adjusted under 35 U.S.C. 154(b) by 368 days.

(21) Appl. No.: 13/953,587

(22) Filed: Jul. 29, 2013

(65) Prior Publication Data

US 2015/0029486 A1   Jan. 29, 2015

(51) Int. Cl.
*G01C 3/08* (2006.01)
*G01S 5/16* (2006.01)
*G08G 1/16* (2006.01)

(52) U.S. Cl.
CPC ... *G01C 3/08* (2013.01); *G01S 5/16* (2013.01); *G08G 1/166* (2013.01)

(58) Field of Classification Search
CPC ........................................................ G01C 3/08
See application file for complete search history.

(56) References Cited

U.S. PATENT DOCUMENTS

| 8,441,622 | B2* | 5/2013 | Gammenthaler | G01S 17/023 356/28 |
| 2004/0021853 | A1* | 2/2004 | Stam | B60Q 1/1423 356/218 |
| 2005/0195383 | A1* | 9/2005 | Breed | B60N 2/002 356/4.01 |
| 2010/0198478 | A1* | 8/2010 | Shin | B60W 10/06 701/96 |
| 2012/0150484 | A1* | 6/2012 | Odhner | G01S 3/781 702/150 |
| 2013/0158943 | A1* | 6/2013 | Odhner | F41G 3/02 702/150 |

* cited by examiner

*Primary Examiner* — Luke Ratcliffe

(74) *Attorney, Agent, or Firm* — East West Law Group; Heedong Chae

(57) ABSTRACT

An apparatus for detecting a lead distance between a user vehicle and a target vehicle includes first and second position sensitive devices (PSD) arranged in the user vehicle orthogonal to the distance and each having first and second light receivers configured to receive light emitted from the target vehicle, in which the first and second PSDs output voltage corresponding intensity of light received by the first and second light receivers, and a controller configured to receive voltages output from the first and second PSDs and calculate the distance using Equation 1: $L=(KD/d)/(v_1-v_2)$.

4 Claims, 3 Drawing Sheets

METHOD AND APPARATUS FOR DETECTING DISTANCE BETWEEN VEHICLES

TECHNICAL FIELD

The present disclosure relates to a method and apparatus for detecting a distance between vehicles, and more particularly, to a method and apparatus for detecting an accurate lead distance between a lead vehicle and a tailing vehicle in real time and informing the driver of the detected result, thereby contributing to safety driving while increasing reliability of the detected result.

BACKGROUND

Generally, a distance between vehicles is measured to ensure safety driving and to control a safety distance between vehicles. When driving a vehicle on a road in heavy traffic congestion, a driver continues to step on or off a brake pedal while checking the distance from a leading vehicle in front thereof, and such brake manipulation causes driver fatigue. Furthermore, at high speed, the distance from the lead vehicle becomes an important safety factor.

In addition, a lead distance control system recently used for safe driving or unmanned driving also requires accurate detection of a distance between vehicles.

In the related art, radars, stereo cameras, or the like have been used to measure the distance between vehicles.

However, radars are very expensive, causing an increase in vehicle price when equipped to a vehicle. The stereo cameras are also expensive, require a very precise technique for tuning operation, and have difficulty in application to mass production of vehicles.

SUMMARY

Aspects of the present disclosure are conceived to solve such problems in the related art and to provide a method and apparatus for detecting an accurate lead distance between a user vehicle and a target vehicle in front of the user vehicle in real time and informing the user of the detected result, thereby contributing to safety driving while increasing reliability of the detected result.

Other aspects will become apparent from descriptions of the following exemplary embodiments of the present disclosure.

In one aspect of the present disclosure, an apparatus for detecting a lead distance between a user vehicle and a target vehicle in front of the user vehicle includes: first and second position sensitive devices (PSD) arranged in the user vehicle orthogonal to the lead distance and each having first and second light receivers configured to receive light emitted from the target vehicle, the first and second PSDs outputting voltages corresponding to intensities of light received by the first and second light receivers; and a controller receiving the voltages output from the first and second PSDs to calculate the lead distance using a following Equation 1:

$$L = (KD/d)/(v1-v2),$$

where L is the lead distance, v1 is a voltage output from the first PSD, v2 is a voltage output from the second PSD, K is a constant that equals $L1 \times v1$ or $L2 \times v2$ (where L1 is a vertical distance between a virtual light-emitter spaced a distance (d) from the first light receiver on the first PSD and light received by the first light receiver, and L2 is a vertical distance between a virtual light-emitter spaced a distance (d) from the second light receiver on the second PSD and light received by the second light receiver), D is a distance between the first and second light receivers, and d is a distance between the first virtual light emitter and the first light receiver or between the second virtual light emitter and the second light receiver.

The first and second PSDs may allow the first and second light receivers to receive visible light emitted backwards from visible light-emitters installed in tail lamps of the target vehicle and to output voltages corresponding to the received visible light, respectively.

In another aspect of the present disclosure, a method of detecting a lead distance between a user vehicle and a target vehicle in front of the user vehicle includes: arranging first and second position sensitive devices (PSD) orthogonal to the lead distance in the user vehicle, the first and second PSDs having first and second light receivers, respectively; by the first and second light receivers, receiving light emitted from tail lamps of the target vehicle and outputting voltages corresponding to intensities of received light; performing electric filtering of outputs from the first and second PSDs to divide signals from left and right tail lamps of the target vehicle; and calculating the lead distance using Equation 1 by receiving and using the voltages output from the first and second PSDs and electrically filtered.

Outputting voltages corresponding to intensities of received light may be performed by the first and second PSDs such that the first and second light receivers respectively receive visible light emitted backwards from visible light-emitters placed in tail lamps of the target vehicle, and output voltages corresponding to the received visible light.

The apparatus and method for detecting a distance between vehicles according to the present disclosure precisely may detect a lead distance between a user vehicle and a target vehicle in front of the user vehicle in real time, and informs a user or the like of the detected result, thereby contributing to safety driving while increasing reliability of the detected result.

BRIEF DESCRIPTION OF THE DRAWINGS

The above and other aspects, features and advantages of the present disclosure will become apparent from the following description of exemplary embodiments given in conjunction with the accompanying drawings, in which.

DETAILED DESCRIPTION

Figure 1:
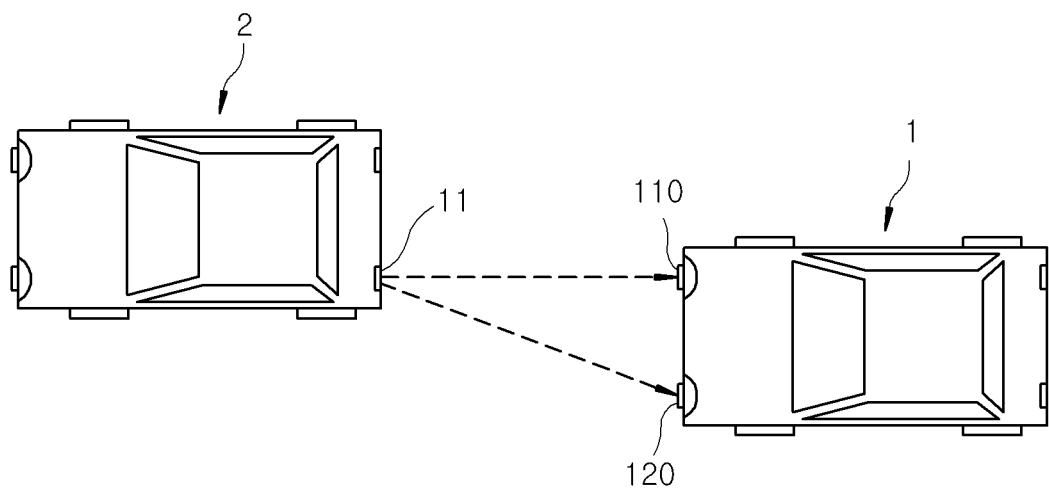
FIG. 1 illustrates an apparatus for detecting a distance between vehicles according to one exemplary embodiment of the present disclosure.

The present disclosure will now be described more fully hereinafter with reference to exemplary embodiments in conjunction with the accompanying drawings. The present disclosure may, however, be embodied in many different forms and should not be construed as being limited to the embodiments set forth herein. Rather, these embodiments are provided so that this disclosure will be thorough and complete, and will fully convey the scope of the invention, including all changes, equivalents, and modifications, to those skilled in the art.

Exemplary embodiments of the present disclosure will now be described in detail with reference to the accompanying drawings. Wherever possible, the same reference numerals will be used throughout the drawings. Like components will be denoted by like reference numerals throughout the specification and repeated descriptions thereof will be omitted.

Figure 2:
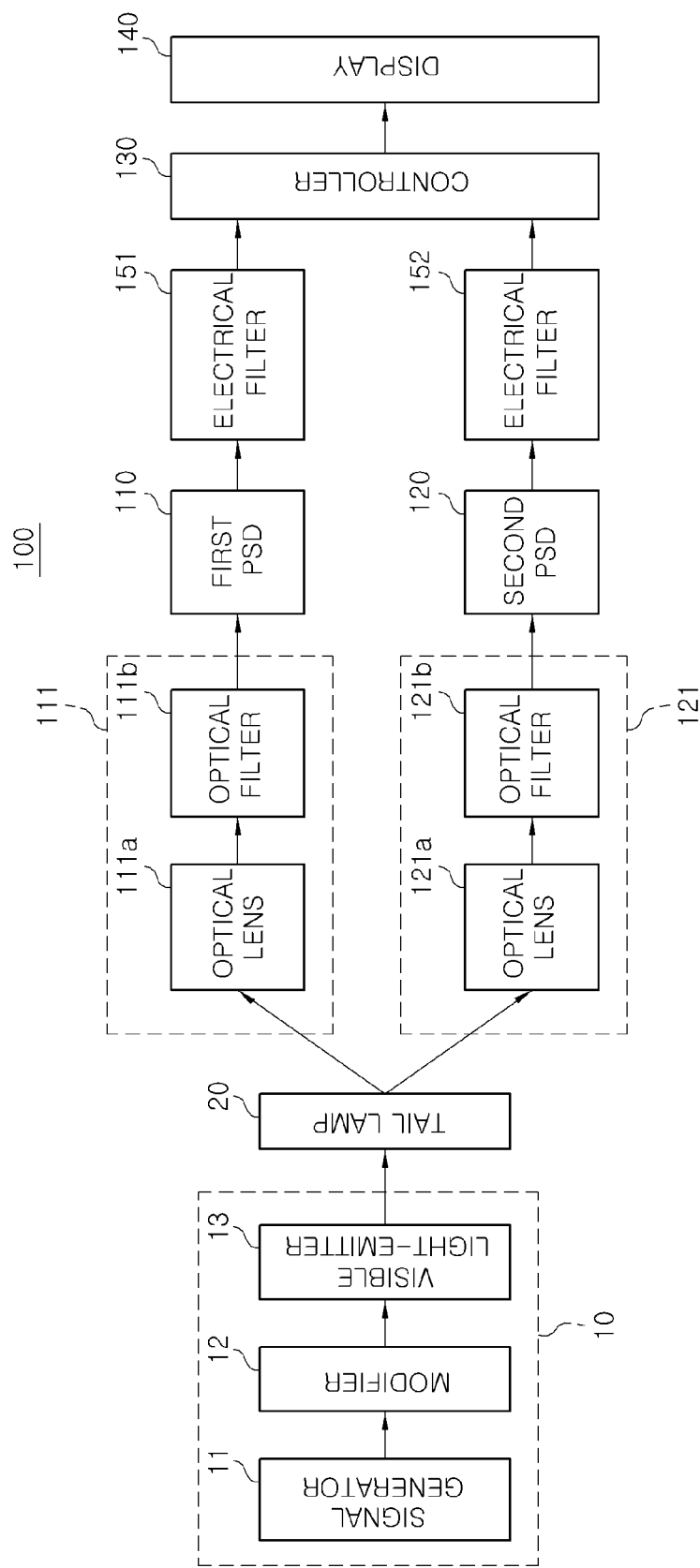
FIG. 2 is a block diagram of the apparatus for detecting a distance between vehicles according to the embodiment of the present disclosure.

FIG. 1 illustrates an apparatus for detecting a distance between vehicles according to one exemplary embodiment of the present disclosure, and FIG. 2 is a block diagram of the apparatus for detecting the distance between vehicles according to the embodiment of the present disclosure.

Referring to FIGS. 1 and 2, the apparatus 100 according to one exemplary embodiment of the present disclosure is configured to detect a lead distance between a user vehicle 1 and a target vehicle 2 in front of the user vehicle 1, and includes first and second position sensitive devices (PSDs) 110, 120 and a controller 130.

The target vehicle 2 may transmit a signal modified into a specific frequency through a tail lamp 20, and may be provided with a transmitter 10, which includes a signal generator 11, a modifier 12 and a visible light-emitter 13. Here, the signal generator 11 generates a sine wave signal having frequencies ranging from 100 to 50 MHz for modification of visible light. In addition, the modifier 12 modifies visible light in the terahertz frequency range so as to modify signals from the signal generator 11 into pure carrier signals. Further, the visible light-emitter 13 serves as a driver for driving a light emitting device (LED). For clarity, the transmitter 10 is exemplified as being placed in one of rear left and right sides of the target vehicle in FIG. 2.

Each of the first and second PSDs 110, 120 includes a semiconductor device that detects a position of input light in a p-n junction using surface resistance of a semiconductor. In the vehicle 1, the first and second PSDs are arranged orthogonal to the lead distance, and includes first and second light receivers 111, 121 to receive light emitted from the target vehicle 2. For example, the first and second light receivers 111, 121 may be arranged orthogonal to the lead distance and output voltages corresponding to the intensities of light received by the first and second light receivers 111, 121, respectively.

The first and second light receivers 111, 121 may include optical lenses 111a, 121a for optically collecting light received, and optical filters 111b, 121b for removing noise by other light sources from the optical lenses 111a, 121a.

In the first and second PSDs 110, 120, each of the first and second light receivers 111, 121 may receive visible light emitted backwards from a visible light-emitter, which is placed in the tail lamp 20 of the target vehicle 2, and output voltage corresponding to the intensity of the received light.

In outputting voltage from the first and second PSDs 110, 120, electrical filters 151, 152 may be used based on center frequencies modified by the modifier 12 to remove noise from other light sources. For example, the electrical filters 151, 152 may be band-pass filters. Modified frequencies from the left or right tail lamp 20 of the target vehicle 2 may be divided into frequencies f1 and f2. Thus, the center frequencies of the electrical filters 151, 152 may also be composed of the frequencies f1 and f2.

Figure 3:
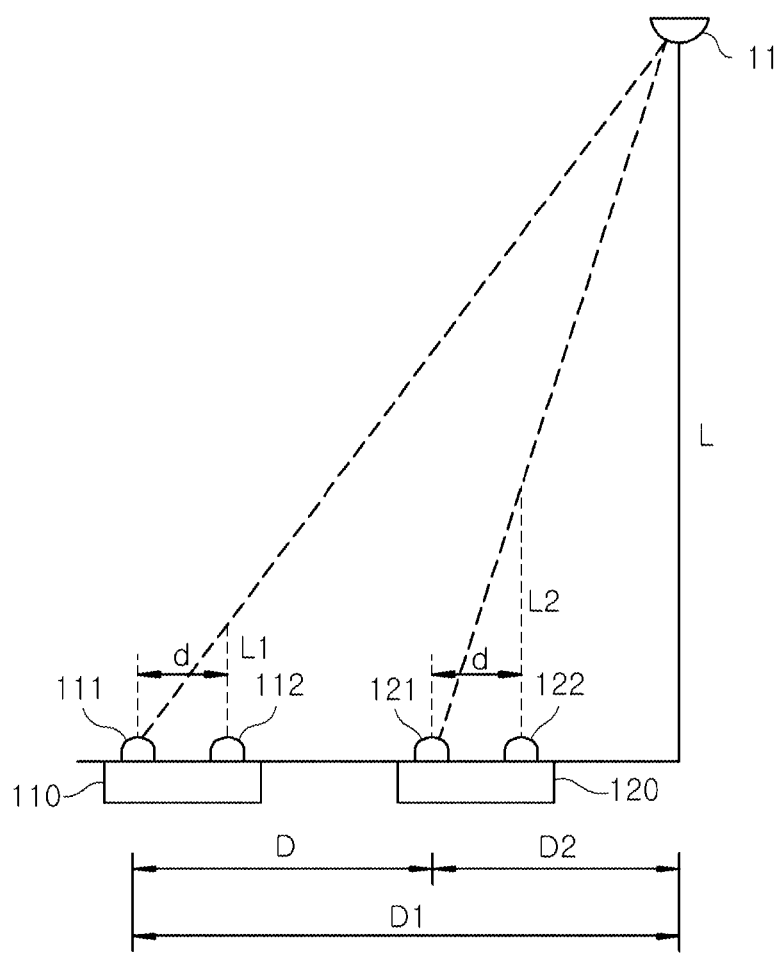
FIG. 3 is a view explaining a method of detecting a distance between vehicles according to one exemplary embodiment of the present disclosure.

The controller 130 receives voltages output from the first and second PSDs 110, 120 and calculates a lead distance between vehicles using Equation 1:

$$L=(KD/d)/(v1-v2) \qquad$$

where, referring to FIG. 3, L is the lead distance, v1 is a voltage output from the first PSD 110, v2 is a voltage output from the second PSD 120, K is a constant that equals L1×v1 or L2×v2 (where L1 is a vertical distance between a virtual light-emitter 112 spaced a distance (d) from the first light receiver 111 on the first PSD 110 and light received by the first light receiver 111, and L2 is a vertical distance between a virtual light-emitter 122 spaced a distance (d) from the second light receiver 121 on the second PSD 120 and light received by the second light receiver 121), D is a distance between the first and second light receivers 111, 121, and d is a distance between the first virtual light emitter 112 and the first light receiver 111 or between the second virtual light emitter 122 and the second light receiver 112.

L1 and L2 are virtual lines parallel to the lead distance L and can be obtained by the following Equations 2 and 3.

$$L1=K/v1 \qquad <\text{Equation 2}>$$

$$L2=K/v2 \qquad <\text{Equation 3}>$$

In Equations 2 and 3, K is a constant that can be experimentally obtained with reference to a relationship between L1 and v1 or L2 and v2.

In addition, referring to FIG. 3, Equations 4 and 5 can be obtained as follows:

$$L1/d=L/D1 \qquad <\text{Equation 4}>$$

$$L2/d=L/D2 \qquad <\text{Equation 5}>$$

Here, d is a constant that indicates a distance between the first or second light receiver 111 or 121 and the first or second virtual light emitter 112 or 122.

According to Equations 2 to 5, the following Equation 6 can be obtained, and Equation 1 can be obtained from Equation 6:

$$D=D1-D2=dL(1/L1-1/L2)=(dL/K)-(v1-v2).$$

When the lead distance L between the target vehicle 2 and the user vehicle 1 which is provided with the first and second PSDs 110, 120 is calculated, the controller 130 may display the calculated value on a display 140, which is mounted on a dashboard or other positions in the vehicle 1.

The first and second PSDs 110, 120 may be provided on light incident surfaces thereof with an array of photodiodes, any of which may be the first and second light receivers 111, 121.

A method of detecting a distance between vehicles according to one exemplary embodiment may include arranging first and second PSDs, outputting voltages corresponding to intensities of light, performing electrical filtering, and calculating the distance between vehicles.

In arranging first and second PSDs, the first and second PSDs 110, 120 are arranged orthogonal to the lead distance L in the vehicle 1. Thus, the first and second PSDs 110, 120, particularly the first and second light receivers 111, 121, may be arranged orthogonal to the lead distance L such that a direction of the lead distance L to be measured is determined according to such arrangement of the first and second PSDs or the first and second light receivers.

In outputting voltages corresponding to intensities of light, the first and second PSDs 110, 120 receive light emitted from tail lamps 20 of the target vehicle 2 through the first and second light receivers 111, 121, and output voltages v1 and v2 that correspond to the intensities of light received. Here, the first and second PSDs 110, 120 receive visible light emitted backwards from the tail lamps 20 of the target vehicle 2 through the first and second light receivers 111, 121, and output voltages corresponding thereto, respectively.

In performing electrical filtering, the output voltages of the first and second PSDs 110, 120 are electrically filtered by electrical filters 151, 152 in order to divide signals from the left and right tail lamps of the target vehicle 2.

In calculating the lead distance, the lead distance L is calculated according to Equation 1 after receiving voltages v1 and v2, which are output from the first and second PSDs 110, 120 and electrically filtered. This operation may be performed by the controller 130, and the lead distance L calculated by the controller 130 may be displayed through the display 140.

The apparatus and method for detecting a distance between vehicles according to the embodiment of the present disclosure may precisely detect a lead distance between a user vehicle and a target vehicle in front of the user vehicle in real time, and inform a user or the like of the detected results, thereby contributing to safety driving while increasing reliability of the detected result.

While the present disclosure has been described with reference to the case of using 1D PSD, this is merely illustrative and the technical scope of the present disclosure is not limited thereto. The present disclosure can also be adapted to or include 2D PSD.

Although some exemplary embodiments have been described herein, it should be understood by those skilled in the art that these embodiments are given by way of illustration only, and that various modifications, variations, and alterations can be made without departing from the spirit and scope of the present invention. For example, the respective components of the embodiments may be embodied in different ways. Further, the scope of the present invention should be interpreted according to the following appended claims as covering all modifications or variations induced from the appended claims and equivalents thereof.

LEGEND OF DRAWING

FIG. 2
11: Signal generator
12: Modifier
13: Visible light-emitter
20: Tail lamp
110: First PSD
120: Second PSD
111*a*, 121*a*: Optical lens
111*b*, 121*b*: Optical filter
130: Controller
140: Display
151, 152: Electrical filter

What is claimed is:

1. An apparatus for detecting a lead distance between a user vehicle and a target vehicle in front of the user vehicle, comprising:
   first and second position sensitive devices (PSD) arranged in the user vehicle orthogonal to the lead distance and each having first and second light receivers configured to receive light emitted from the target vehicle, the first and second PSDs outputting voltages corresponding to intensities of light received by the first and second light receivers; and
   a controller receiving the voltages output from the first and second PSDs to calculate the lead distance using Equation 1:

$$L=(KD/d)/(v1-v2)$$

where L is the lead distance,
   v1 is a voltage output from the first PSD,
   v2 is a voltage output from the second PSD,
   K is a constant that equals L1×v1 or L2×v2 (where L1 is a vertical distance between a virtual light-emitter spaced a distance (d) from the first light receiver on the first PSD and light received by the first light receiver, and L2 is a vertical distance between a virtual light-emitter spaced a distance (d) from the second light receiver on the second PSD and light received by the second light receiver),
   D is a distance between the first and second light receivers, and
   d is a distance between the first virtual light emitter and the first light receiver or between the second virtual light emitter and the second light receiver.

2. The apparatus of claim 1 wherein the first and second PSDs allow the first and second light receivers to receive visible light emitted backwards from visible light-emitters installed in tail lamps of the target vehicle and to output voltages corresponding to the received visible light, respectively.

3. A method of detecting a lead distance between a user vehicle and a target vehicle in front of the user vehicle, comprising:
   arranging first and second position sensitive devices (PSD) orthogonal to the lead distance in the user vehicle, the first and second PSDs having first and second light receivers, respectively;
   by the first and second light receivers, receiving light emitted from tail lamps of the target vehicle and outputting voltages corresponding to intensities of received light;
   performing electric filtering of outputs the first and second PSDs to divide signals from left and right tail lamps of the target vehicle; and
   calculating the lead distance using an Equation 1 by receiving and using the voltages output from the first and second PSDs and electrically filtered,
   wherein Equation 1 is:

$$L=(KD/d)/(v1-v2)$$

where L is the lead distance,
   v1 is a voltage output from the first PSD,
   v2 is a voltage output from the second PSD,
   K is a constant that equals L1×v1 or L2×v2 (where L1 is a vertical distance between a virtual light-emitter spaced a distance (d) from the first light receiver on the first PSD and light received by the first light receiver, and L2 is a vertical distance between a virtual light-emitter spaced a distance (d) from the second light receiver on the second PSD and light received by the second light receiver),
   D is a distance between the first and second light receivers, and
   d is a distance between the first virtual light emitter and the first light receiver or between the second virtual light emitter and the second light receiver.

4. The method of claim 3, wherein the outputting voltages corresponding to intensities of received light is performed by the first and second PSDs such that the first and second light receivers respectively receive visible light emitted backwards from visible light-emitters placed in tail lamps of the target vehicle and output voltages corresponding to the received visible light.

* * * * *